United States Patent
Chessell et al.

(10) Patent No.: US 8,127,315 B2
(45) Date of Patent: Feb. 28, 2012

(54) METHOD, APPARATUS AND SOFTWARE FOR MEASURING THE PERFORMANCE OF A RUNTIME PLATFORM IN RESPONSE TO A PROCESS CALL FROM A SOFTWARE APPLICATION

(75) Inventors: Amanda Elizabeth Chessell, Alton (GB); Robert James Lojek, Lytham St. Annes (GB); Christopher Charles Winter, Waterlooville (GB); Helen Margaret Wylie, Corhampton (GB)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 12/045,944

(22) Filed: Mar. 11, 2008

(65) Prior Publication Data

US 2008/0229336 A1    Sep. 18, 2008

(51) Int. Cl.
*G06F 13/00* (2006.01)
(52) U.S. Cl. ........ 719/330; 709/223; 709/224; 717/127; 717/128

(58) Field of Classification Search .................. 719/330; 709/223, 224; 717/127, 128
See application file for complete search history.

(56) References Cited

U.S. PATENT DOCUMENTS

| | | | |
|---|---|---|---|
| 5,627,766 A * | 5/1997 | Beaven ........................ | 702/122 |
| 5,961,596 A * | 10/1999 | Takubo et al. ................ | 709/224 |
| 6,108,700 A | 8/2000 | Maccabee et al. | |
| 6,662,358 B1 * | 12/2003 | Berry et al. .................... | 717/128 |
| 6,742,143 B2 * | 5/2004 | Kaler et al. ..................... | 714/39 |
| 6,985,940 B1 * | 1/2006 | Jenkin .......................... | 709/224 |
| 7,051,339 B2 | 5/2006 | Deverill et al. | |
| 7,509,632 B2 * | 3/2009 | Boger .......................... | 717/133 |
| 2003/0014464 A1 | 1/2003 | Deverill et al. | |
| 2003/0056200 A1 * | 3/2003 | Li et al. ......................... | 717/128 |
| 2004/0019885 A1 * | 1/2004 | Mandava et al. .............. | 717/158 |
| 2006/0168594 A1 | 7/2006 | Deverill et al. | |
| 2006/0184933 A1 | 8/2006 | Chessell et al. | |

FOREIGN PATENT DOCUMENTS

CA    2436763 A1    8/2005

* cited by examiner

*Primary Examiner* — Andy Ho
(74) *Attorney, Agent, or Firm* — Yee & Associates, P.C.; David A. Mims, Jr.

(57) ABSTRACT

A method, apparatus or software is disclosed for monitoring the performance that an application program receives from a runtime platform.

18 Claims, 6 Drawing Sheets

203

| Platform Ratings ||
|---|---|
| Platform | Rating |
| P1 | 5 |
| P2 | 4 |
| P3 | 17 |

| Process Call Budgets ||
|---|---|
| Call ID | Units |
| C1 | 10 |
| C2 | 8 |
| C3 | 7 |
| C4 | 3 |
| C5 | 21 |

| Performance Log | | |
|---|---|---|
| Call ID | Actual Units | Budget |
| C1 | 9 | 10 |
| C2 | 10 | 8 |
| C3 | 7 | 7 |
| C4 | 3 | 3 |
| C5 | 30 | 21 |
| C1 | 10 | 10 |
| C3 | 9 | 7 |
| C4 | 3 | 3 |
| C1 | 10 | 10 |
| C5 | 20 | 21 |
| C3 | 6 | 7 |
| C1 | 9 | 10 |
| C2 | 11 | 8 |
| C4 | 3 | 3 |
| C3 | 7 | 7 |
| C5 | 28 | 21 |

Figure 4

METHOD, APPARATUS AND SOFTWARE FOR MEASURING THE PERFORMANCE OF A RUNTIME PLATFORM IN RESPONSE TO A PROCESS CALL FROM A SOFTWARE APPLICATION

FIELD OF INVENTION

The present invention relates to a method, apparatus or software for measuring the performance of a runtime platform in response to a process call from a software application.

BACKGROUND OF THE INVENTION

In Information Technology (IT) systems it is common to monitor the performance of the software and hardware that make up an IT system. Such monitoring enables the administrators and customers of such a system to ensure that the system performs within agreed limits. Such limits are often specified in one or more Service Level Agreements (SLAs).

There are many performance measures applied to IT systems. Some performance measures measure the performance of the runtime platform or environment of an application program while other performance measures are aimed at the performance of the application programs themselves. Some performance measures for runtime platforms use the rate of throughput for an individual platform resource, such as a message queue, or the completion time of a particular class of processing request, to provide measures of the performance of the platform. These platform performance measures provide an indication of the performance of the platform itself. Some performance measures for application programs assign units to application program processes, these units are then used to calculate the load that the application will put on a platform on which the application program is deployed. Such units may also be used to estimate the platform processing capacity required for the application program. In other words, these performance measures provide an indication of the impact of the application program in the runtime platform. However, using any of these systems it is difficult to determine the effect of the performance of the runtime platform itself on the performance of an application program running on that platform.

SUMMARY OF THE INVENTION

An embodiment of the invention provides a method for measuring the performance of a runtime platform in response to a process call from a software application, the method comprising the steps of:

a) receiving a start indication from a software application, the start indication indicating of the start of a process call from the software application to a runtime platform for the software application;

b) receiving a stop indication from a software application, the stop indication indicating of the end of the process call; and c) recording the elapsed time between the receipt of the start and stop indications against an identification of the process call so as to provide an indication of the performance of the runtime platform in response to the process call.

The elapsed time may be converted into performance measurement units, the performance measurement units being the product of the elapsed time and a predetermined platform dependent conversion factor. The performance of the runtime platform in response to the process call may be rated against to a predetermined platform independent threshold of performance measurement units assigned to the process call. The start and stop indications may comprise a unique identifier for the process call, the unique identifier providing the identification recorded with the elapsed time. The platform dependent conversion factor may be one of a set of such factors, each of the set being for a different runtime platform to which the process call may be made.

The predetermined threshold may be recorded in association with the elapsed time. Data representing the context in which the process call was made may be recorded in association with the elapsed time. The threshold of performance measurement units assigned to the process call may be determined automatically from the performance of a control runtime environment when processing the process call.

Another embodiment provides a method for measuring the performance of a runtime platform in response to a process call from a software application, the method comprising the steps of:

a) measuring the time taken for a runtime platform to complete a process call in real time;

b) converting the time taken into a runtime platform independent performance measurement units using a predetermined conversion factor for the runtime platform; and c) logging the measurement for the process call in association with a predetermined runtime platform independent threshold for the process call.

A further embodiment provides apparatus for measuring the performance of a runtime platform in response to a process call from a software application, the apparatus being operable to:

receive a start indication from a software application, the start indication indicating of the start of a process call from the software application to a runtime platform for the software application;

receive a stop indication from a software application, the stop indication indicating of the end of the process call; and record the elapsed time between the receipt of the start and stop indications against an identification of the process call so as to provide an indication of the performance of the runtime platform in response to the process call.

Another embodiment provides apparatus for measuring the performance of a runtime platform in response to a process call from a software application, the apparatus being operable to:

measure the time taken for a runtime platform to complete a process call in real time;

convert the time taken into a runtime platform independent performance measurement units using a predetermined conversion factor for the runtime platform; and log the measurement for the process call in association with a predetermined runtime platform independent threshold for the process call.

A further embodiment provides a program or group of programs arranged to enable a programmable device or a group of such devices to perform a method for measuring the performance of a runtime platform in response to a process call from a software application, the method comprising the steps of:

a) receiving a start indication from a software application, the start indication indicating of the start of a process call from the software application to a runtime platform for the software application;

b) receiving a stop indication from a software application, the stop indication indicating of the end of the process call; and c) recording the elapsed time between the receipt of the start and stop indications against an identification of the process call so as to provide an indication of the performance of the runtime platform in response to the process call.

Another embodiment provides a program or group of programs arranged to enable a programmable device or a group of such devices to provide apparatus for measuring the performance of a runtime platform in response to a process call from a software application, the apparatus being operable to:

receive a start indication from a software application, the start indication indicating of the start of a process call from the software application to a runtime platform for the software application;

receive a stop indication from a software application, the stop indication indicating of the end of the process call; and record the elapsed time between the receipt of the start and stop indications against an identification of the process call so as to provide an indication of the performance of the runtime platform in response to the process call.

A further embodiment provides a program or group of programs arranged to enable a programmable device or a group of such devices to perform a method for measuring the performance of a runtime platform in response to a process call from a software application, the method comprising the steps of:

a) measuring the time taken for a runtime platform to complete a process call in real time;

b) converting the time taken into a runtime platform independent performance measurement units using a predetermined conversion factor for the runtime platform; and c) logging the measurement for the process call in association with a predetermined runtime platform independent threshold for the process call.

Another embodiment provides a program or group of programs arranged to enable a programmable device or a group of such devices to provide apparatus for measuring the performance of a runtime platform in response to a process call from a software application, the apparatus being operable to:

measure the time taken for a runtime platform to complete a process call in real time;

convert the time taken into a runtime platform independent performance measurement units using a predetermined conversion factor for the runtime platform; and log the measurement for the process call in association with a predetermined runtime platform independent threshold for the process call.

BRIEF DESCRIPTION OF THE DRAWINGS

Embodiments of the invention will now be described, by way of example only, with reference to the accompanying drawings in which:

FIGS. 3a, 3b & 4 are tables illustrating data used in the system of FIG. 2; and

DETAILED DESCRIPTION OF PREFERRED EMBODIMENTS OF THE INVENTION

Figure 1:
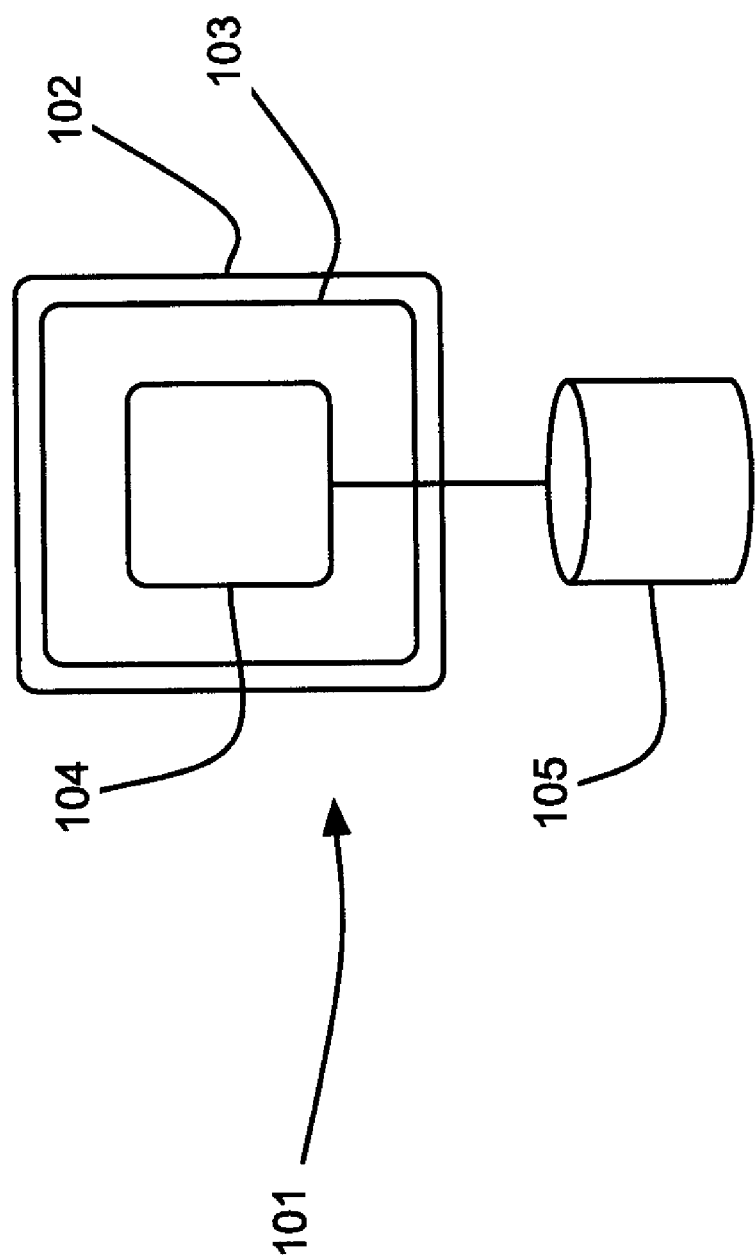
FIG. 1 is a schematic illustration of a computer system.
Figure 2:
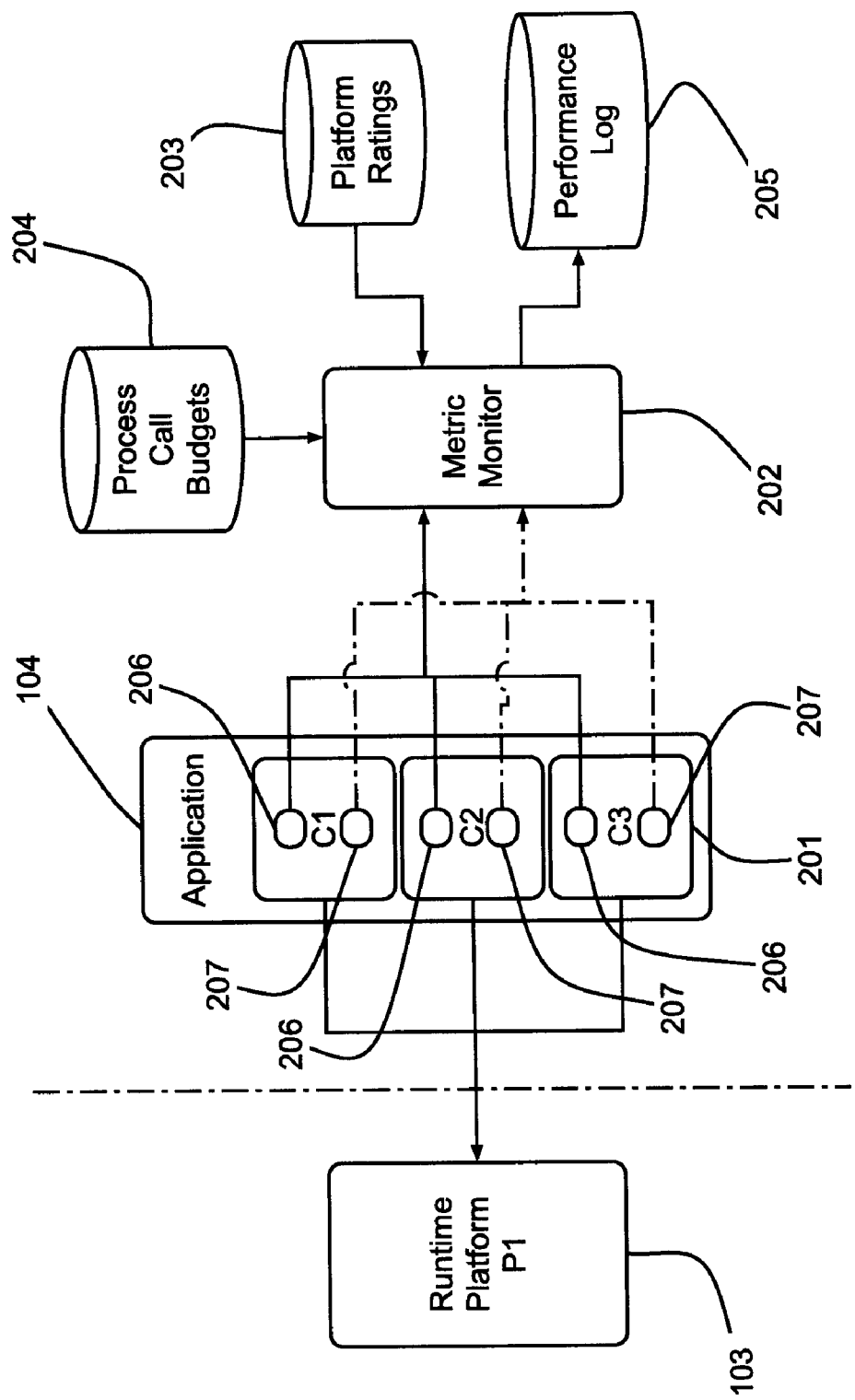
FIG. 2 is a schematic illustration of a system for measuring the performance of a runtime platform in response to a process call from a software application in the computer system of FIG. 1.

With reference to FIG. 1, a computer system 101 comprises a computer 102 providing a runtime platform 103, in the form of a Unix operating system. An application program 104, in the form of a database application program, is arranged to run on the runtime platform 103 and to store the results of its processing on a storage device 105 connected to the computer 102. FIG. 2 shows the programs 103, 104 running on the computer system 101 in further detail. The application program 104 comprises a set of sub-processes 201, each arranged to make process calls (C1, C2, C3) to the runtime platform (P1) 103. The application program 104 also communicates with a further application program in the form of a metric monitor 202. The metric monitor is arranged to measure the level of performance that the application program 104 receives from the runtime platform 103 in response to the process calls (C1, C2, C3).

The metric monitor 202 uses a set of platform ratings 203, in the form of platform dependent conversion factors, and a set of process call budgets 204 to measure the level of performance that the application program 104 receives from the runtime platform 103. The results of the measurements performed by the metric monitor 202 are stored in a performance log 205. Each of the sub-processes 201 comprises a first call 206 and a second call 207 to the metric monitor 202. Each of the first and second calls 206, 207 are related to a given process call (C1, C2, C3) from the respective sub-process 201 to the runtime platform 103. This relationship is determined by the first and second calls 206, 207 being placed in the program code immediately preceding and immediately succeeding the given process call (C1, C2, C3). In other words, each sub-process 201 performs the respective first call 206 to the metric monitor 202, immediately followed by the respective process call (C1, C2, C3) to the metric monitor 202 which is then immediately followed by the respective second call 207 to the metric monitor 202. Both the first and second calls 206, 207 include a call identifier (Call ID), which is unique to the respective process call (C1, C2, C3). The first calls 206 serve as triggers to start a timer process, in the metric monitor 202, assigned to the respective process call (C1, C2, C3). The second calls 206 serve as triggers to stop the timer process running in the metric monitor 202 for the respective process call (C1, C2, C3).

The platform ratings 203 are a set of predetermined metrics used, by the metric monitor 202, to convert the elapsed time recorded for a given process call (C1, C2, C3) into a measure of the performance that the application program 104 receives from the runtime platform 103. The measure is provided in units arranged to be independent of the platform on which the application is being run and are referred to herein as Platform Independent Performance Units (PIPU). The conversion from elapsed process call time to PIPU can be stated as follows:

Elapsed Process Call Time×Platform Rating=PIPUs

FIG. 3a shows a table illustrating the set of platform ratings 203 determined for the present embodiment. Each platform rating is determined by testing a control set of process calls on a control example of each platform (P1, P2, P3) to obtain corresponding relative measurements of the processing performance or speed of each platform. A higher platform rating indicates a low performance or slow processing speed platform. The platform ratings are arranged such that they each produce the same number of PIPUs for the control set of process calls, thereby ensuring, as far as possible, that a PIPU is a substantially platform independent measurement unit.

FIG. 3a shows a table illustrating the set of process call budgets 204 determined for the present embodiment. A process call budget, in PIPUs, is set for each of the process calls (C1, C2, C3, C4, C5) that may be monitored by metric monitor 202. Each budget is set based on either an estimate set by a system administrator or developer for a given process call

201. Alternatively a budget for a given process call may be set by measuring the performance that the process call receives from a control runtime platform.

During its operation, the metric monitor 202 is arranged to time each process call, convert each time into PIPUs and to log this data in the performance log 205. In addition, the metric monitor 202 also records the appropriate process call budget against each entry. FIG. 4 shows a table illustrating the contents of the performance log 205 after sixteen process calls. Each entry in the performance log comprises the Call ID of the process call, the actual PIPUs recorded for that call and the associated PIPU budget assigned to the respective process call. Where the actual PIPUs for a given call are less than or equal to the corresponding budget, this indicates that the level of performance that the application program 104 received from the runtime platform 103 was within an acceptable limit. Where the actual PIPUs for a given call are greater than the corresponding budget, this indicates that the level of performance that the application program 104 received from the runtime platform 103 was outside an acceptable limit. The limits, as defined by the process call budgets 204 may be defined in a Service Level Agreement (SLA) between a user, operator or provider of the runtime platform 103 and a user, operator or provider of the application program 104.

Figure 5:
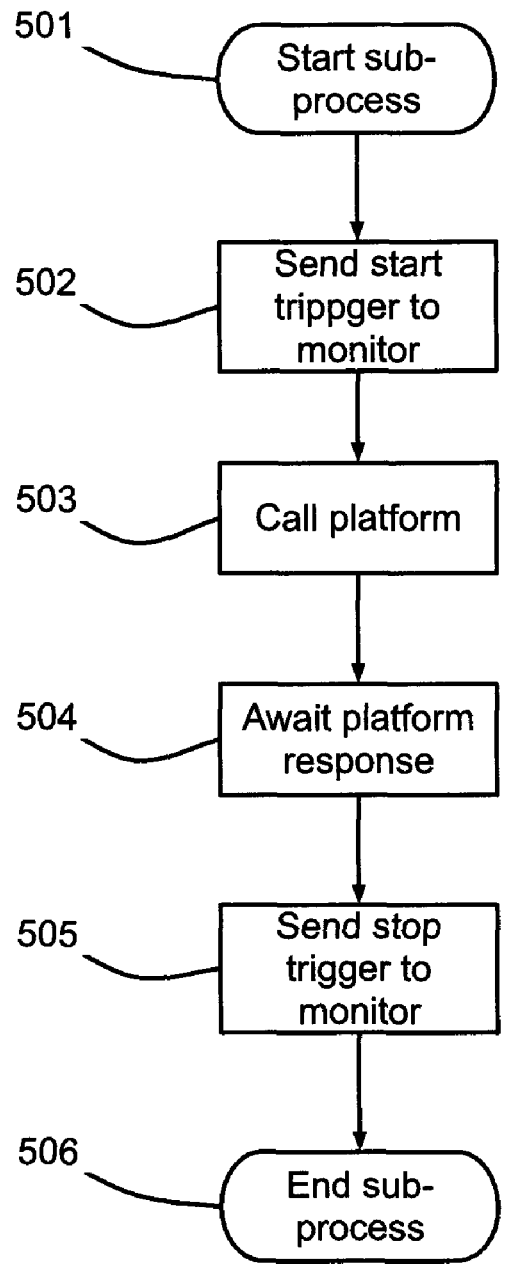
FIGS. 5 & 6 are flow charts illustrating processing performed by the system of FIG. 2.

The processing carried out by each of the sub-processes 201 when processing each of the process calls (C1 to C5) will now be described further with reference to the flowchart of FIG. 5. At step 501, the processing of the sub-process is initiated and processing moves to step 502. At step 502, when the first call 206 is encountered, the call 206, including the call ID for the subsequent process call, is made to the metric monitor 202 so as to trigger a timer for the process call. Processing then moves to step 503 where the process call is made to the runtime platform 103. Processing then moves to step 504 to wait for the process call to return. On the return of the process call, processing moves to step 505. At step 505, the second call 207, including the call ID of the preceding process call, is made to the metric monitor 202 so as to trigger the end of the timer for the process call. Processing then continues with any further instructions in the sub-process and then ends at step 506.

Figure 6:
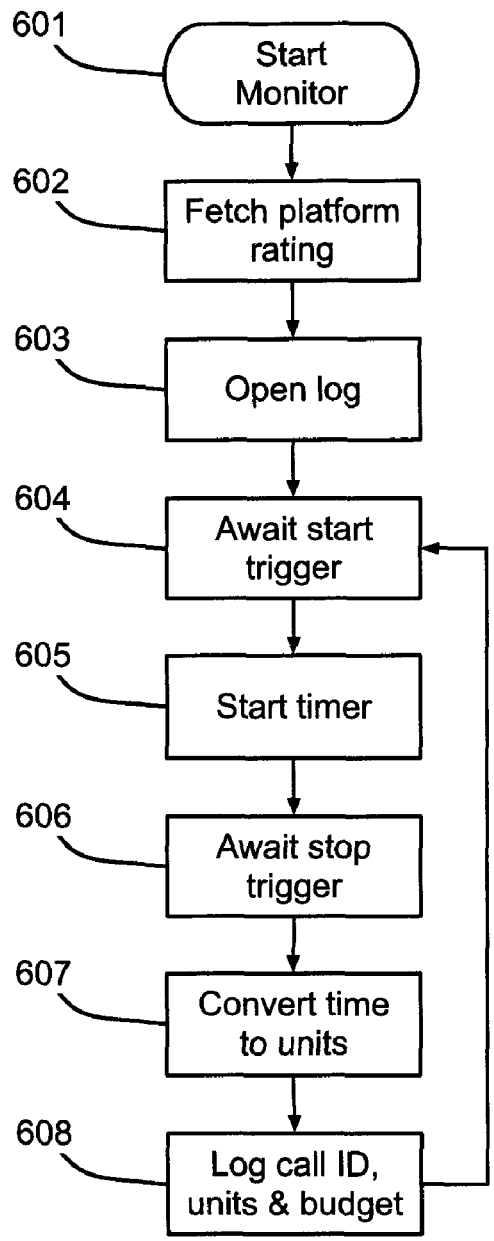

The processing carried out by the metric monitor 202 when monitoring the level of performance that the application program 104 receives from the runtime platform 103 will now be described further with reference to the flowchart of FIG. 6. At step 601, the metric monitor 202 is initiated and processing moves to step 602. At step 602, the runtime platform 103 is identified and the appropriate platform rating extracted from the set of platform ratings 203. Processing then moves to step 603 where the performance log 205 is initialized and processing moves to step 604 to await the first trigger from the application program 104. When the first trigger is received from the application program 104 processing moves to step 605 where a timer, assigned to the call ID in the trigger, is started. Processing then moves to step 606 to await a stop trigger for the timer. When the stop trigger carrying the appropriate call ID is received, processing moves to step 607 where the timer is stopped and the elapsed time converted to PIPU using the extracted platform rating. Processing then moves to step 608 where the process call budget, for the process call, is extracted from the process call budgets 204 and stored in the performance log 205 along with the calculated PIPU value and the call ID. Processing then returns to step 604 to await a further trigger and proceeds as described above.

The performance log thus provides a record of the level of performance, at process call resolution, that the application program 104 receives from the runtime platform 103. The limits, as defined by the process call budgets 204 may be defined in a Service Level Agreement (SLA) between a user, operator or provider of the runtime platform 103 and a user, operator or provider of the application program 104.

In another embodiment, the context in which a given process call to the runtime platform was made is also recorded for each entry in the performance log.

In a further embodiment, the process call budgets are set automatically by running the process call on a control runtime platform. The process call budgets may also be automatically adjusted in response to new versions or builds of the application program from which they are made.

In another embodiment, the code for the application program may be created by an automated or semi-automated coding process such as a model driven approach. The coding process is arranged to automatically insert the first and second calls to the metric monitor either side of process calls to the runtime platform.

In a further embodiment, the metric monitor is arranged to monitor multiple process calls from one or more application programs in parallel, each process call being assigned a separate timer process.

In another embodiment, process call budgets are provided for the application program as a whole.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for measuring performance of a runtime platform in response to a process call from a software application, said method comprising the steps of:
    a) receiving a start indication from a software application, said start indication indicating a start of a process call from said software application to a runtime platform for said software application;
    b) receiving a stop indication from a software application, said stop indication indicating an end of said process call; and
    c) recording an elapsed time between said receipt of said start and stop indications against an identification of said process call so as to provide an indication of the performance of said runtime platform in response to said process call.

2. The method according to claim 1 in which said elapsed time is converted into performance measurement units, said performance measurement units being a result of said elapsed time and a predetermined platform dependent conversion factor.

3. The method according to claim 2 in which said platform dependent conversion factor is one of a set of platform dependent conversion factors, with each one of said set being for a different runtime platform to which said process call may be made.

4. The method according to claim 1 in which said performance of said runtime platform is rated against a predetermined platform independent threshold of performance measurement units assigned to said process call.

5. The method according to claim 4 in which said predetermined threshold is recorded in association with said elapsed time.

6. The method according to claim 4 in which the threshold of performance measurement units assigned to said process call is determined automatically from a performance of a control runtime environment when processing said process call.

7. The method according to claim 1 in which said start and stop indications comprise a unique identifier for said process call, said unique identifier providing said identification recorded with said elapsed time.

8. The method according to claim 1 in which data representing a context in which said process call was made is recorded in association with said elapsed time.

9. The method according to claim 1 further comprising:
   a) measuring a time taken for the runtime platform to complete the process call in real time;
   b) converting said time taken into runtime platform independent performance measurement units using a predetermined conversion factor for said runtime platform; and
   c) logging said converted time for said process call in association with a predetermined runtime platform independent threshold for said process call.

10. An apparatus for measuring performance of a runtime platform of a computer system in response to a process call from a software application, said apparatus being operable to:
   receive a start indication from a software application, said start indication indicating a start of a process call from said software application to a runtime platform for said software application;
   receive a stop indication from a software application, said stop indication indicating an end of said process call; and
   record an elapsed time between the receipt of said start and stop indications against an identification of said process call so as to provide an indication of the performance of said runtime platform in response to said process call.

11. The apparatus according to claim 10 in which said elapsed time is converted into performance measurement units, said performance measurement units being a result of said elapsed time and a predetermined platform dependent conversion factor.

12. The apparatus according to claim 11 in which said platform dependent conversion factor is one of a set of platform dependent conversion factors, with each one of said set being for a different runtime platform to which said process call may be made.

13. The apparatus according to claim 10 in which said performance of said runtime platform is rated against to a predetermined platform independent threshold of performance measurement units assigned to said process call.

14. The apparatus according to claim 13 in which said predetermined threshold is recorded in association with said elapsed time.

15. The apparatus according to claim 13 in which the threshold of performance measurement units assigned to said process call is determined automatically from a performance of a control runtime environment when processing said process call.

16. The apparatus according to claim 10 in which said start and stop indications comprise a unique identifier for said process call, said unique identifier providing said identification recorded with said elapsed time.

17. The apparatus according to claim 10 in which data representing a context in which said process call was made is recorded in association with said elapsed time.

18. A storage means comprising a computer program for measuring performance of a runtime platform, the computer program comprising instructions which, when executed in a data processing system, causes the data processing system to carry out the steps of:
   a) receiving a start indication from a software application, said start indication indicating a start of a process call from said software application to a runtime platform for said software application;
   b) receiving a stop indication from a software application, said stop indication indicating an end of said process call; and
   c) recording an elapsed time between said receipt of said start and stop indications against an identification of said process call so as to provide an indication of the performance of said runtime platform in response to said process call.

* * * * *